Oct. 27, 1925.

A. H. MÜLLER

WATER GATE

Filed April 13, 1925

Inventor
A. H. Müller

Oct. 27, 1925.
A. H. MÜLLER
1,559,351
WATER GATE
Filed April 13, 1925    2 Sheets-Sheet 2
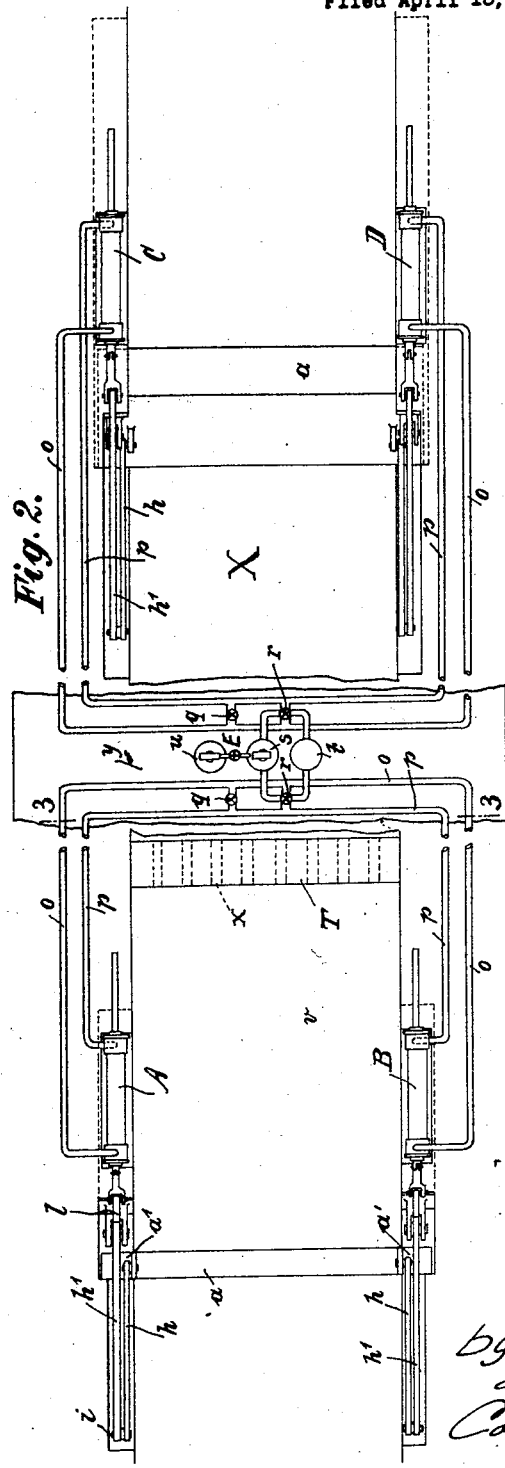
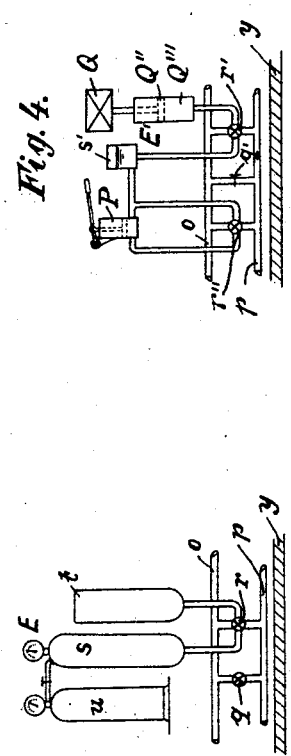
Inventor
A.H. Müller
by Langner Parry
Card & Langner
Attys.

Patented Oct. 27, 1925.

1,559,351

UNITED STATES PATENT OFFICE.

ARTHUR HUGO MÜLLER, OF BLANKENESE, NEAR HAMBURG, GERMANY.

WATER GATE.

Application filed April 13, 1925. Serial No. 22,837.

*To all whom it may concern:*

Be it known that I, ARTHUR HUGO MÜLLER, a citizen of Germany, residing at Blankenese, near Hamburg, Germany, have invented certain new and useful Improvements in a Water Gate (for which I have filed an application in Germany on November 5, 1923), of which the following is a specification.

The present invention refers to a water gate particularly adapted to be used in canal locks, weirs, sluices and the like. The novelty of this gate resides in that the gate body, which is hinged or linked to the walls of the water way or sluice and preferably at the bottom thereof, serves for shutting off or holding back the water, and which, in opening falls down flaplike in the direction of fluid flow under the action of the pressure of the upper water; can be held or locked in any position by a fluid brake. The energy of the work done by the fluid pressure is at the same time, collected in a hydraulic accumulator so as to be ready to be used for operating, for instance, the gate in leveled water or for shutting the gate against the pressure of water. The transmission of the movement of the gate to the brake may be accomplished by knee-levers, known per se. The brake cylinders may also be used as working cylinders for closing the gate against the pressure of the water. For realizing the high pressure necessary therefor, pressure pumps may be used.

Two forms of constructing the new gate are shown in the accompanying drawing, wherein:

Fig. 2 is a plan view of the canal lock of Fig. 1.

Fig. 3 is a section on line 3—3 of Fig. 2 and

Fig. 4 is a view corresponding to that of Fig. 3, of a modification.

Figure 1:
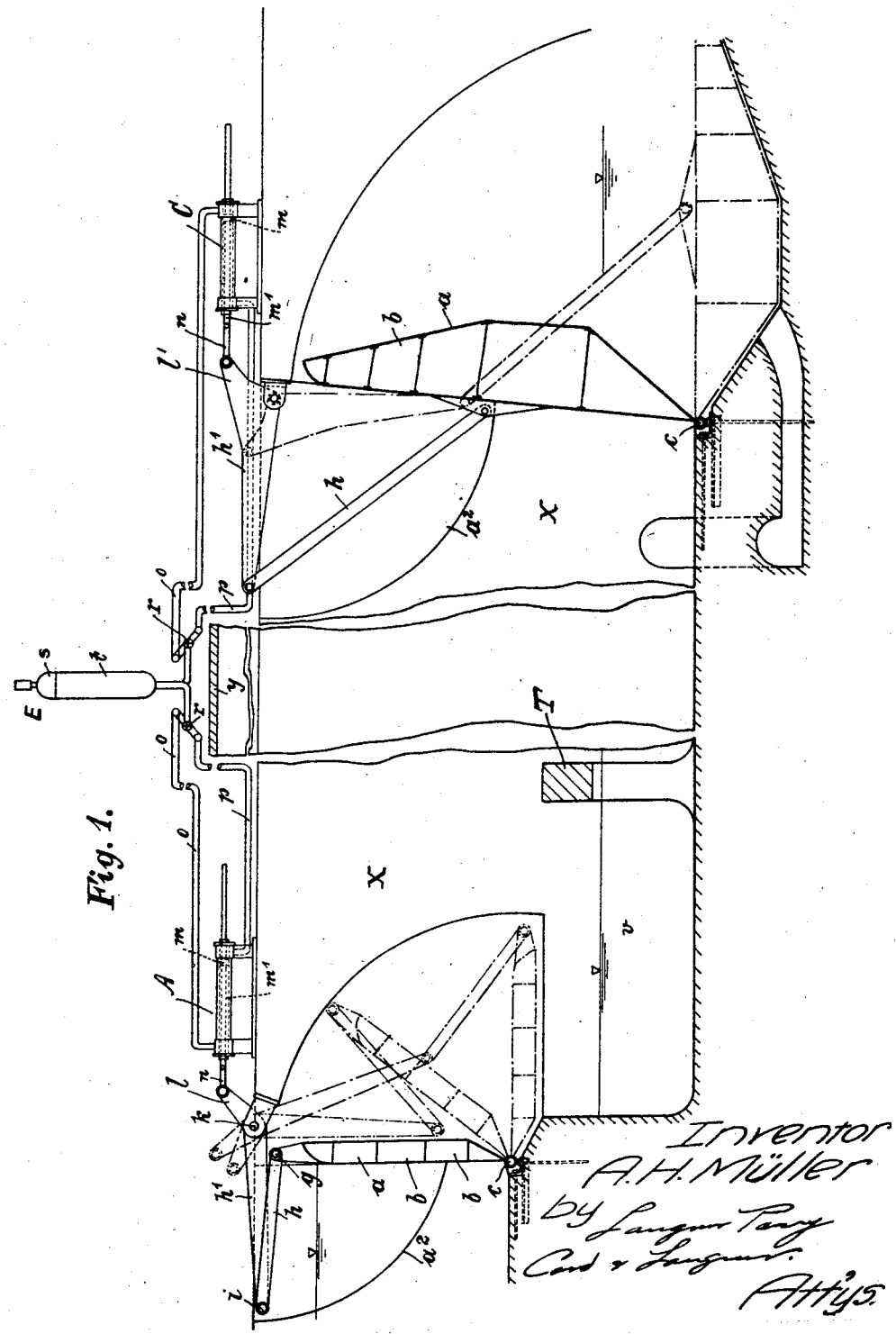
Fig. 1 is a longitudinal section of a canal lock provided with the new gate.

The gate $a$, which for balancing its own weight when in lowered position, may be provided with air chambers $b$, is in the construction shown, hinged to the bottom of the lock channel by its lower edge $c$. The air chambers $b$ have a tendency to raise the gate due to their buoyancy. To withstand the pressure of the upper water when in closed position, the gate is held by two links $h$, which, by way of example, are pivotally attached to the side-edges $a'$ of the gate $a$ and project into recesses $a^2$ of the side walls of the canal. Thus in the construction shown in Figs. 1 and 2 the links are pivotally connected to the gate at $g$ on the side of the upper water. By a pin $i$ each link $h$ is connected to one arm of a bell crank lever $h'$, to thus form a knee lever. The bell-crank levers $h'$ are journaled at $k$ on the wall of the lock chamber X and their other arms $l$ and $l'$ are connected with pistons $m$ of hydraulic cylinder A, B or C, D by means of piston rods $m'$ and pitmen $n$.

The cylinder A and B arranged on the side walls of the lock are connected with one another by pipes $o$ and $p$ for insuring their uniform operation. When the two pipes are connected with one another by opening the valve $q$ a more or less frictionless circulation of the brake fluid corresponding to the amount of the opening of the valve, sets in, and the gate is opened under the influence of the pressure of the upper water. If, however, the accumulator E is also included in the circuit, the brake fluid according to the position of the four-way-cock $r$ will either compress the air within the vessel $s$ or else it will be pressed into the pipes and do work within the cylinders A and B of the upper gate or C and D of the lower gate, by causing the gate to move. The open vessel $t$ serves as a balance tank. When the amount of latent energy accumulated in the vessel S, or the pressure at disposal, is not sufficient to close the gate against the pressure of the water, the vessel $s$ is connected with a second vessel $u$ which may be filled with liquid air or some other highly compressed gas.

Alternatively, as shown in Fig. 4, an accumulator E' can be used. In this form, control valves $q'$ and $r'$ correspond to valve $q$ and $r$ of Fig. 3. Instead of having the fluid compress a gas, as in S of Fig. 3, the fluid flows into a tank S' and exerts its pressure in raising a weight Q' mounted on a piston Q'' in a cylinder Q''', connected with S'. As in connection with the form shown in Fig. 3, if additional pressure be needed, a high pressure pump P is connected to the pipes $p$ and $o$ through a control valve $r''$.

It is of advantage, in both forms, to arrange valves $q$ and $r$, and $q'$, $r'$, $r''$ on the platform $y$ for the attendant.

When the lower gate is constructed in a manner generally similar to the upper gate, the two gates $a$ can be operated without having to resort to any mechanical auxiliary means. Such sluice gates may with advantage be used for directly filling or emptying the chamber X. In this case it is advisable to arrange an auxiliary basin $v$, separated from the chamber by a wall T, which is perforated by a comparatively large number of apertures $x$ to decrease the rush of the water into the chamber X. When the emptying of the chamber is carried out over and past the lower gate $a$, the latter must be lowered evenly, corresponding to the lowering of the water level in the chamber. The accumulation of the energy therefore can be continued for a greater length of time than with the upper gate $a$.

The constructions shown are of course given only by way of example. It is evident that any existing waterways and water channels of any kind can be provided with the above described gate. The rods, links and levers may be arranged in any desired manner on the upper water portion as well as on the lower water portion, but the arrangement shown has the advantage that the operating members can be so constructed as to be more or less self-locking in the raised positions as shown in Fig. 1, and thus afford a desirable relief for the brake cylinder. Moreover the relation between the path of the brake piston and that of the gate, and thus the relation between the pressure of water on the gate and the pressure within the fluid brake and the accumulator, is very favorable.

I claim:—

1. In a water gate for sluices, canal locks, weirs and the like, the combination of a flap gate opening in the direction of water flow and arranged to be opened by the pressure of the water controlled thereby, a fluid brake to absorb the work done by the water operating the flap gate, a hydraulic accumulator for collecting the energy from the brake, and means for retransmitting the collected energy to the flap gate.

2. In a water gate for sluices, canal locks, weirs and the like, the combination of a flap gate opening in the direction of water flow and arranged to be opened by the pressure of the water controlled thereby, a fluid brake, links and levers connected to form knee-levers connecting the fluid brake to the flap gate.

3. In a water gate for sluices, canal locks, weirs and the like, the combination of a flap gate opening in the direction of water flow and arranged to be opened by the pressure of the water controlled thereby, a fluid brake, links and levers connected to form knee-levers connecting the fluid brake and the flap gate, and a source of pressure connected to the fluid brake.

4. In a water gate for sluices, canal locks, weirs and the like, the combination of a flap gate opening in the direction of water flow and arranged to be opened by the pressure of the water controlled thereby, a fluid brake, links and levers connected to form knee-levers connecting the fluid brake and the flap gate, an air vessel, and a circulation pipe interconnecting the air vessel and the fluid brake.

5. In a water gate for sluices, canal locks, weirs and the like, the combination of a flap gate opening in the direction of water flow and arranged to be opened by the pressure of the water controlled thereby, a fluid brake to absorb the work done by the water operating the flap gate, a hydraulic accumulator connected to the brake for collecting energy from the brake, and a compressed gas vessel connected to the accumulator.

6. In a water gate for sluices, canal locks, weirs and the like, the combination of a flap gate opening in the direction of water flow and arranged to be opened by the pressure of the water controlled thereby, a fluid brake, links and levers connected to form knee-levers connecting the fluid brake and the flap gate, an air vessel, a circulation pipe interconnecting the air vessel and the fluid brake, and a compressed gas vessel connected to the air vessel.

ARTHUR HUGO MÜLLER.